United States Patent
Linwood et al.

(10) Patent No.: US 12,215,928 B2
(45) Date of Patent: Feb. 4, 2025

(54) THERMAL ENERGY STORAGE AND POWER GENERATION SYSTEM

(71) Applicant: GYFT Labs, St. Helens, OR (US)

(72) Inventors: Eric Joseph Linwood, St. Helens, OR (US); Kyle Allen Hanson, St. Helens, OR (US); Cody William Dunlop, St. Helens, OR (US)

(73) Assignee: GYFT Labs, St. Helens, OR (US)

( * ) Notice: Subject to any disclaimer, the term of this patent is extended or adjusted under 35 U.S.C. 154(b) by 226 days.

(21) Appl. No.: 18/067,474

(22) Filed: Dec. 16, 2022

(65) Prior Publication Data
US 2023/0266071 A1   Aug. 24, 2023

Related U.S. Application Data

(60) Provisional application No. 63/291,879, filed on Dec. 20, 2021.

(51) Int. Cl.
*F28D 20/00* (2006.01)

(52) U.S. Cl.
CPC ...... *F28D 20/00* (2013.01); *F28D 2020/0013* (2013.01); *F28D 2020/0065* (2013.01)

(58) Field of Classification Search
CPC .............. F28D 20/00; F28D 2020/0013; F28D 2020/0065; F28D 20/0034
USPC .......................................................... 165/10
See application file for complete search history.

(56) References Cited

U.S. PATENT DOCUMENTS

| | | | | |
|---|---|---|---|---|
| 3,492,461 A | * | 1/1970 | Lawrence | F24H 7/0433 126/400 |
| 3,558,856 A | * | 1/1971 | Lawrence | F24H 1/225 219/492 |
| 4,246,466 A | | 1/1981 | Rice et al. | |
| 5,083,605 A | * | 1/1992 | Collings | B64D 13/00 165/41 |
| 5,220,954 A | * | 6/1993 | Longardner | F28D 20/021 165/104.11 |
| 5,687,706 A | * | 11/1997 | Goswami | F24H 7/0433 165/902 |
| 7,159,643 B2 | * | 1/2007 | Kudo | F28D 20/021 165/10 |
| 9,709,337 B2 | * | 7/2017 | Pilebro | F28D 20/0043 |
| 10,222,135 B2 | * | 3/2019 | Owens | F28D 20/02 |
| 10,935,327 B2 | * | 3/2021 | Wirz | F24H 7/0208 |
| 11,009,298 B2 | * | 5/2021 | Desgrosseilliers | F28D 20/0034 |

(Continued)

FOREIGN PATENT DOCUMENTS

| CN | 2280248 Y | 4/1998 |
|---|---|---|
| CN | 2670826 Y | 1/2005 |

(Continued)

*Primary Examiner* — Jon T. Schermerhorn, Jr.
(74) *Attorney, Agent, or Firm* — Seed IP Law Group LLP

(57) ABSTRACT

A thermal energy storage and power generation system includes a thermal energy storage device including a container, a heating element in the container, a pair of fins in the container and arranged on opposite sides of the heating element, a thermal storage material in the container, and a tube in the container and extending around the thermal storage material. The system also includes a generator in communication with the thermal energy storage device for converting thermal energy into electrical energy as well as subsystems for regulating and controlling the system.

22 Claims, 11 Drawing Sheets

(56) References Cited

U.S. PATENT DOCUMENTS

| | | | | |
|---|---|---|---|---|
| 2004/0251011 | A1* | 12/2004 | Kudo | F28D 20/00 165/172 |
| 2012/0227926 | A1* | 9/2012 | Field | F24S 10/95 165/157 |
| 2013/0266295 | A1* | 10/2013 | Kreutzman | F24D 19/1006 392/308 |
| 2014/0060771 | A1* | 3/2014 | Bell | F28D 17/02 126/400 |
| 2015/0060008 | A1* | 3/2015 | Wirz | F28D 20/02 165/10 |
| 2016/0201650 | A1 | 7/2016 | Okazaki et al. | |
| 2017/0205152 | A1* | 7/2017 | Grama | F28D 20/02 |
| 2017/0219294 | A1* | 8/2017 | Longis | F28D 20/023 |
| 2018/0149352 | A1* | 5/2018 | Kodak | F01K 3/262 |

FOREIGN PATENT DOCUMENTS

| | | |
|---|---|---|
| CN | 206669944 U | 11/2017 |
| JP | S5795545 A | 6/1982 |
| JP | 2000110515 A | 4/2000 |

\* cited by examiner

THERMAL ENERGY STORAGE AND POWER GENERATION SYSTEM

BACKGROUND

Technical Field

The present disclosure is generally directed towards energy storage and power generation systems, and more particularly, towards thermal energy storage and power generation systems.

Description of the Related Art

Various types of energy storage systems are known; however, all of them have some types of drawbacks and/or limitations. As a result, there is a continuous search for technological improvements to energy generation and storage systems. One example of a current solution for storing energy on a residential scale includes the use of battery banks. Electrical energy is transferred to the batteries via the electrical power grid or by renewable sources and stored for later use. Energy storage is particularly important for renewable energy sources, because many of these sources produce energy in spurts or intervals, e.g., wind, solar, and the like, so this renewable energy must typically be stored until it is needed. However, known battery technologies have a number of disadvantages. For example, batteries are expensive and include toxic and volatile metals, such as lead and lithium. These problems are only exacerbated with larger battery banks that are typically employed at residential or industrial scales. Further, known battery-based storage systems may require the use of inverters, transformers, and other complex electrical systems that are not particularly well suited to widespread adoption and use.

In response, thermal energy storage systems have been proposed for storing thermal energy and converting it into electrical energy. However, known thermal energy storage system have limited conversion efficiency (i.e., from thermal potential to electricity) and may also have high cost. As a result, thermal energy storage systems have not been widely adopted as an alternative to battery banks. It would therefore be a technological improvement to have a thermal energy storage system that overcomes the above-discussed disadvantages and negative environmental impacts of known electrical storage systems.

BRIEF SUMMARY

The present disclosure is directed to thermal energy storage and power generation systems, devices, and methods that provide an alternative to current energy storage solutions that are toxic, costly, and complex. The technological improvements of the disclosed systems and methods remove the need for electrical batteries and instead store energy in the form of thermal potential energy, which is then converted back to electrical energy based on demand. The thermal energy storage and power generation systems, devices, and methods described herein are intended to compliment current energy systems and may interface with the electrical grid, photovoltaic ("PV") systems, wind or water turbine systems, and also direct thermal energy sources such as flame or waste heat, among others.

Embodiments of the disclosure include one or more thermal storage systems, generators, auxiliary generator-specific modules, and associated accessories and electrical systems to connect each internal system. Thermal energy is stored by charging the thermal storage device via an electrical heating element or other direct thermal source. Once the thermal storage is at capacity, the thermal source is regulated to keep the storage at the optimal temperature. Thermal energy stored in a thermal transfer media passing through the thermal storage is transferred to the generator system in response to a demand for electricity and the generator-specific auxiliary modules are activated. Electrical power is generated, processed, and regulated to a standard voltage for consumption. When the demand for electrical power ceases, the system returns to a dormant state except for ongoing regulation of the thermal storage device, which may include a thermal input to recharge and maintain the thermal storage.

One or more embodiments of a system according to the present disclosure may be summarized as including: a thermal energy storage device, including a container, a heating element in the container, a pair of fins in the container and arranged on opposite sides of the heating element, a thermal storage material in the container and surrounding the heating element and the pair of fins, and a tube in the container and extending around a perimeter of the thermal storage material, the tube having an inlet and an outlet extending through the container; a generator in communication with the outlet and the inlet of the tube of the thermal energy storage device; a cooling system in communication with the generator; and an electrical generation and distribution system in communication with the thermal energy storage device, the generator, and the cooling system.

In some embodiments of the system, the container of the thermal energy storage device is an inner container, and the thermal energy storage device is an outer container and an insulation layer between the inner container and the outer container. In another aspect of some embodiments, the insulation layer is at least one of aerated concrete, fiberglass, and a vacuum layer. In still another aspect of some embodiments, the outer container and the inner container are metal. In yet another aspect of some embodiments, the heating element of the thermal energy storage device includes a plurality of contacts electrically connected to the heating element and extending through the container. In other embodiments, the system further includes a power source in communication with the plurality of contacts.

In some embodiments, the power source is an electrical grid or a renewable energy source. In another aspect of some embodiments, the tube is copper coiled around the perimeter of the thermal storage material from a bottom to a top of the container. In still another aspect of some embodiments, the thermal storage material includes an iron oxide mineral. In yet another aspect of some embodiments, the generator includes one or more of a turbine, a bladeless turbine, and a thermoelectric generator array.

One or more embodiments of a system according to the present disclosure may be summarized as including: a thermal energy storage device including an outer container, an inner container, and an insulation layer between the outer container and the inner container. In some embodiments, the inner container includes a heating element having electrical contacts extending through the inner container and the outer container, at least one fin interfacing with the heating element, a thermal storage material surrounding the heating element and the at least one fin, and a tube coiled around a perimeter of the thermal storage material from a bottom to a top of the inner container. In some aspects of one of more embodiments, the tube has an inlet and an outlet extending through the inner container and the outer container.

In some embodiments, the system may further include: a generator in communication with the outlet and the inlet of the tube of the thermal energy storage device, a cooling system in communication with the generator, and an electrical generation and distribution system in communication with the thermal energy storage device, the generator, and the cooling system. In another aspect of some embodiments, the thermal energy storage device and the generator are in communication in a hot loop. The hot loop is a closed hot loop including a condensing reservoir and a recirculation pump for returning thermal transfer media from the generator to the thermal energy storage device in one or more embodiments. In still another aspect of some embodiments, the hot loop is an open hot loop including a thermal exchange assembly, a settling tank, and a purified water tank. In some embodiments, the tube of the thermal energy storage device is copper. In another aspect of some embodiments, the outer container and the inner container are the same material. In still another aspect of some embodiments, the insulation layer is at least one of aerated concrete, fiberglass, and a vacuum layer. In yet another aspect of some embodiments, the system further includes a thermally insulating lid on the outer container and the inner container. In some embodiments, the thermally insulating lid including aerated concrete.

One or more embodiments of a system according to the present disclosure may be summarized as including: a thermal energy storage device, including a container, a heating element in the container, a pair of fins in the container and arranged on opposite sides of the heating element, a thermal storage material in the container and surrounding the heating element and the pair of fins, and a tube in the container and extending around a perimeter of the thermal storage material, the tube having an inlet and an outlet extending through the container; a generator in communication with the outlet and the inlet of the tube of the thermal energy storage device; and an electrical generation and distribution system in communication with the thermal energy storage device and the generator.

In some embodiments, the system may further include the hot loop being a closed hot loop including a condensing reservoir and a recirculation pump for returning thermal transfer media from the generator to the thermal energy storage device. In an aspect of some embodiments, the hot loop is an open hot loop including a thermal exchange assembly, a settling tank, and a purified water tank.

BRIEF DESCRIPTION OF THE SEVERAL VIEWS OF THE DRAWINGS

The present disclosure will be more fully understood by reference to the following figures, which are for illustrative purposes only. These non-limiting and non-exhaustive embodiments are described with reference to the following drawings, wherein like labels refer to like parts throughout the various views unless otherwise specified. The sizes and relative positions of elements in the drawings are not necessarily drawn to scale in some figures. For example, the shapes of various elements are selected, enlarged, and positioned to improve drawing legibility. In other figures, the sizes and relative positions of elements in the drawings are exactly to scale. The particular shapes of the elements as drawn may have been selected for ease of recognition in the drawings. The figures do not describe every aspect of the teachings disclosed herein and do not limit the scope of the claims.

DETAILED DESCRIPTION

Persons of ordinary skill in the art will understand that the present disclosure is illustrative only and not in any way limiting. Other embodiments of the presently disclosed systems, devices, and methods readily suggest themselves to such skilled persons having the assistance of this disclosure.

Each of the features and teachings disclosed herein can be utilized separately or in conjunction with other features and teachings to provide thermal energy storage and power generation devices, systems, and methods. Representative examples utilizing many of these additional features and teachings, both separately and in combination, are described in further detail with reference to attached FIGS. 1-17. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present devices, systems and methods.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced, but are not intended to limit the dimensions and the shapes shown in the examples in some embodiments. In some embodiments, the dimensions and the shapes of the components shown in the figures are intended to limit the dimensions and the shapes of the components.

Figure 1:
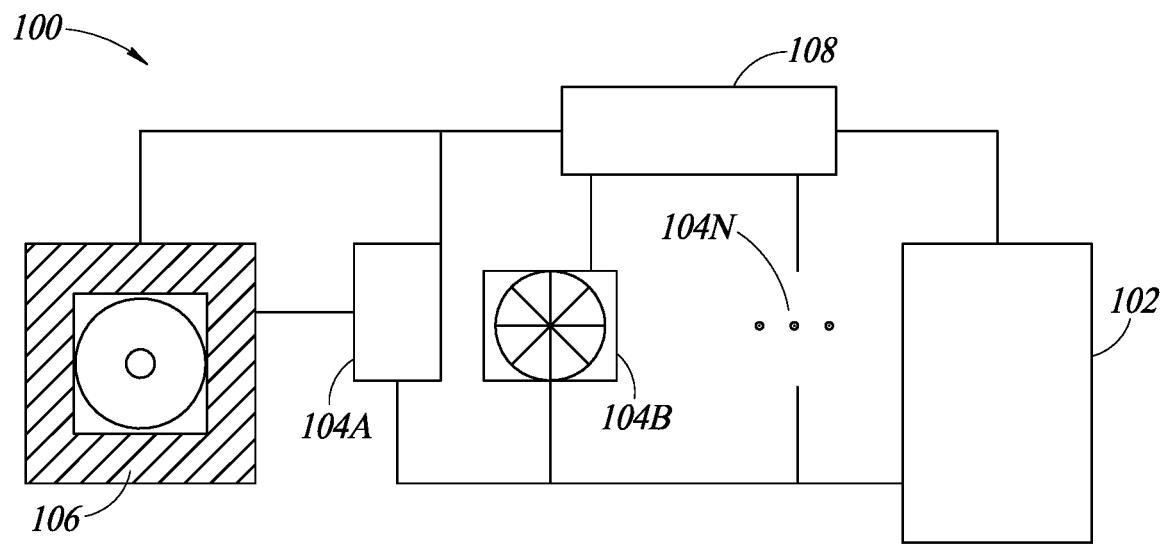
FIG. 1 is a schematic illustration of an embodiment of a thermal energy storage and power generation system according to the present disclosure.

FIG. 1 is a schematic illustration of an embodiment of a thermal energy storage and power generation system 100 (or system 100). The system includes a thermal energy storage device 102, generators 104A, 104B, . . . 104N, a cooling system 106 and a controller 108 (which may also be referred to herein as an electrical regulation and distribution system 108). As shown in FIG. 1, in some embodiments the system 100 includes a loop with the thermal energy storage device 102 in communication with the generators 104A, 104B, the generators 104A, 104B in communication with the cooling system 106, and the cooling system 106 is in communication with the thermal energy storage device 102. The controller 108 is in communication with each of the functional components of the system, namely, the thermal energy storage device 102, the generators 104A, 104B, and the cooling system 106.

In some embodiments, the system 100 is design to be modular, upgradable, and expandable based on the use case. For example, in one or more embodiments, the system 100 is considered one unit or one subsystem in a larger array of identical units that cooperate to meet a given electricity demand. Further, although FIG. 1 illustrates generators 104A, 104B, in various embodiments, the system 100 includes only one of generator 104A and 104B or both generators 104A and 104B. The system 100 may also include additional generators or other devices, generally indicated by the ellipses and reference 104N. As will be explained in greater detail below, the generators 104A, 104B may be any device for converting thermal or kinetic energy potential into electrical energy, including but not limited to turbines, bladeless turbines, and thermoelectric generators, among others.

In operation, the thermal energy storage device 102 provides thermal or kinetic energy potential to the generators 104A, 104B. The generators 104A, 104B convert the thermal or kinetic energy potential to electricity based on demand. The cooling system 106 cools the generator 104A and removes excess heat from the system 100. The controller 108 manages the output of generator 104A, monitors sensors within the system, regulates a temperature of the thermal storage device 102, and activates the cooling system 106 as needed, among other functions described herein.

Figure 2:
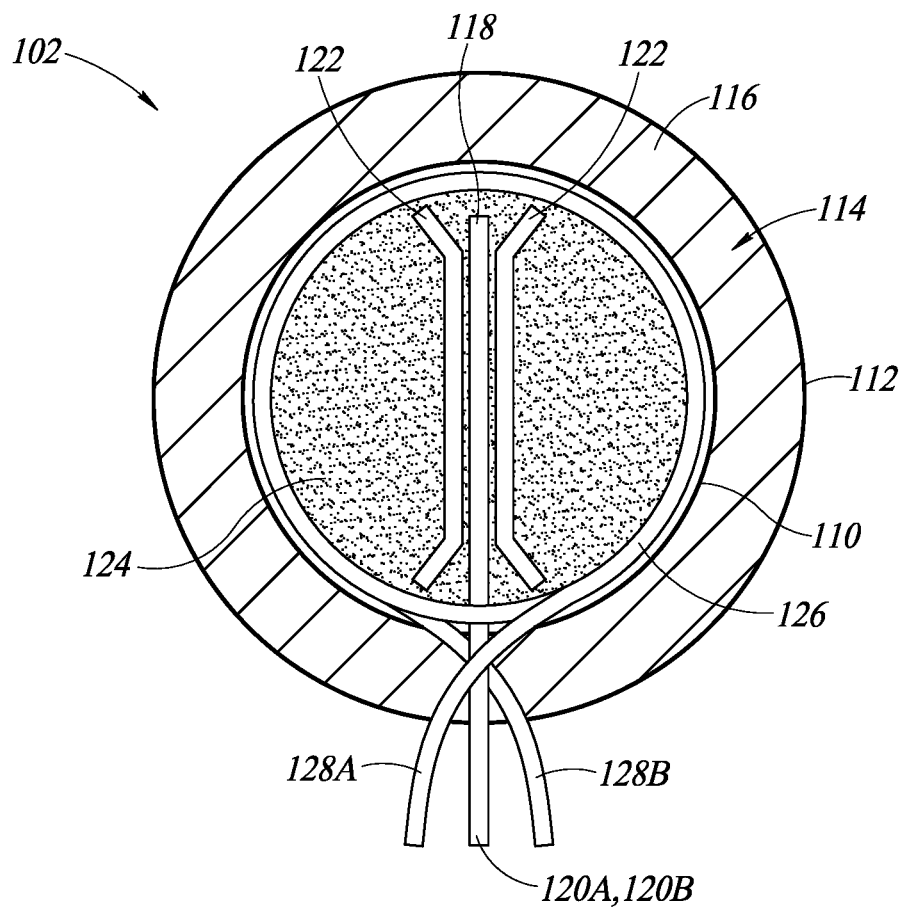
FIGS. 2-3 are cross-sectional views of a thermal energy storage device of the system of FIG. 1.
Figure 3:
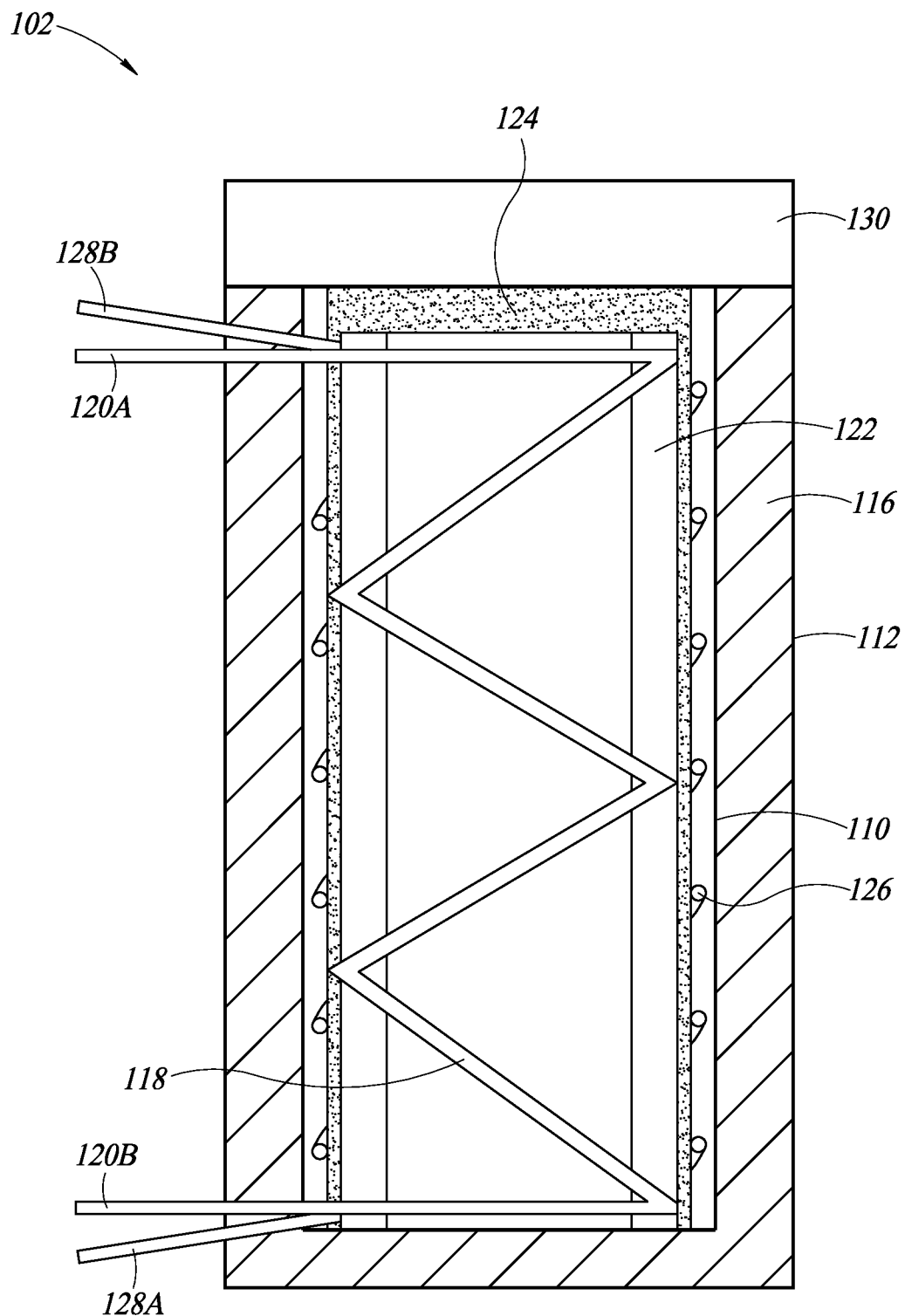

FIG. 2 and FIG. 3 are cross-sectional views of the thermal energy storage device 102. FIG. 2 is a plan cross-sectional view along a horizontal plane through the device 102 and FIG. 3 is an elevational cross-sectional view along a vertical plane through the device 102. With reference to FIG. 2 and FIG. 3, the thermal energy storage device 102 includes an inner container 110 and an outer container 112 that are spaced from each other across a gap 114. In some embodiments, the containers 110, 112 are made of metal or other high-temperature resistant material. In some non-limiting examples, the inner container 110 is received inside of, and internal to, the outer container 112. In some embodiments, the gap 114 is empty. In other embodiments, the gap 114 is filled with a thermal insulation layer or a thermal insulating material 116 extending around the inner container 110. For example, in some implementations, the thermal insulation layer 116 is aerated concrete or fiberglass insulation. In other implementations, the layer 116 is a vacuum layer (i.e., the gap 114 is sealed at negative pressure relative to atmospheric pressure). The above examples are non-limiting. In still other embodiments, the insulation layer 116 is any insulating material or insulation method.

In some embodiments of the thermal energy storage and power generation system 100, the inner container 110 of the device 102 includes a heating element 118 that extends through a center of the inner container 110. The heating element 118 is coupled to electrical contacts 120A, 120B that extend through the inner container 110, the insulation layer 116, and the outer container 112 to enable an electrical connection between a power source and the heating element 118. In various embodiments, the heating element 118 is selected to be in one or many possible selected shapes. Additionally, in some embodiments, the heating element 118 includes components that are one or more of metal, ceramic and semiconductor materials, thick film heaters, positive temperature coefficient ("PTC") rubber, liquid, composite heaters, and combination heating element systems. In some embodiments, the heating element 118 is a tubular electric heater including a metal tube, an electrical insulator layer in the tube, and a resistance-heating element extending through the electric insulator layer.

In another aspect of the thermal energy storage and power generation system 100, the device 102 further includes a pair of fins 122 in the inner container 110 that are positioned on either side of the heating element 118 for spreading heat generated by the heating element 118 throughout the inner container 110. Additionally, some embodiments of the thermal energy storage and power generation system 100, include a thermal storage material 124 in the inner container 110 that is positioned around the heating element 118 and the fins 122. The thermal storage material 124 fills or substantially fills the inner container 110 and surrounds the heating element 118 and the fins 122 in some embodiments. In some implementations, the thermal storage material 124 is a thermally dense, high-temperature thermal storage material 124, such as magnetite or iron oxide, among other suitable materials. In another aspect of some embodiments, the device 100 also includes a thermally conductive coil 126 wrapped around a perimeter of the thermal storage material 124 or extending around an inner surface of the inner container 110. In some embodiments, the thermal storage material 124 fills the inner container 110 and envelops the coil 126 with the coil 126 extending through the material 124 proximate the inner container 110. In other embodiments, the coil 126 is a hollow tube made of copper or another like metal with a thermal transfer medium in the coil 126, such as water or steam in some non-limiting examples.

As shown in FIG. 3, in some implementations, the heating element 118 has a zigzag pattern from a bottom to a top of the inner container 110 with the fins 122 distributing the heat from the heating element 118 to the thermal energy storage material 124. Further, in some implementations, the coil 126 has a helical shape extending around or through the thermal storage material 124 from the bottom to the top of the inner container 110. In another aspect of some embodiments, coil 126 also includes a thermal storage input port 128A and a thermal storage output port 128B that interface with the generators 102A, 102B, as described herein. In still another aspect of some embodiments, the device 102 also includes a lid 130 removably coupled to at least one of the inner container 110 and the outer container 112. Notably, in some embodiments, the lid 130 includes any of the insulation materials described above (e.g., various insulative materials, an air gap, a vacuum, and the like) to maintain heat internal to the device 102 while also being removable to enable access to the inner container 110 and the outer container 112 for maintenance.

In operation, the electrical connections 120A, 120B of the heating element 118 are connected to a power source, which may a local power grid or a renewable energy source. The power source provides electricity to the element 118, which converts electricity to heat. The fins 122 distribute heat from the element 118 to the storage material 124 until the storage material 124 absorbs a maximum amount of thermal energy. In a dormant state where there is no active demand for electricity, the controller 108 then monitors the temperature and thermal storage capacity of the material 124 and selectively operates the heating element 118 as needed to maintain the device 102 at a selected temperature and the thermal storage material 124 at maximum capacity. In some embodiments, upon receipt of a demand for electricity at the controller 108, the stored thermal energy in the material 124 is transferred to the generators 102A, 102B via the thermal transfer medium in the coil 126 and through ports 128A, 128B for conversion to electricity. After the demand terminates, the device 102 is recharged according to the process above until an additional demand is received.

Figure 4:
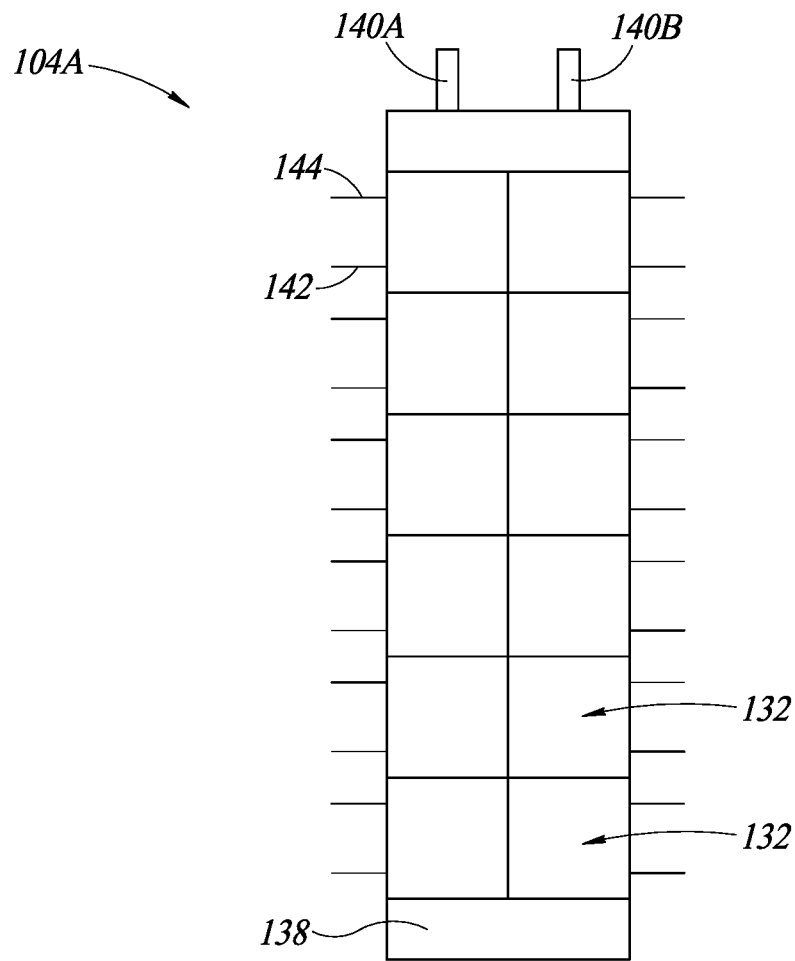
FIGS. 4-6 are various views of a thermoelectric generator of the system of FIG. 1.
Figure 5:
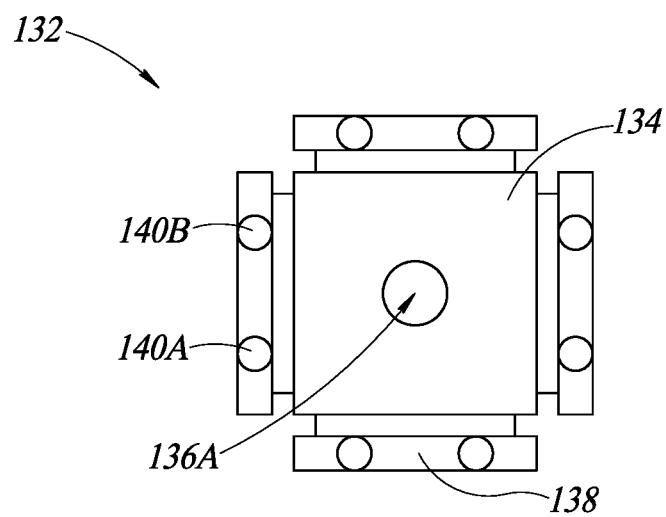
Figure 6:
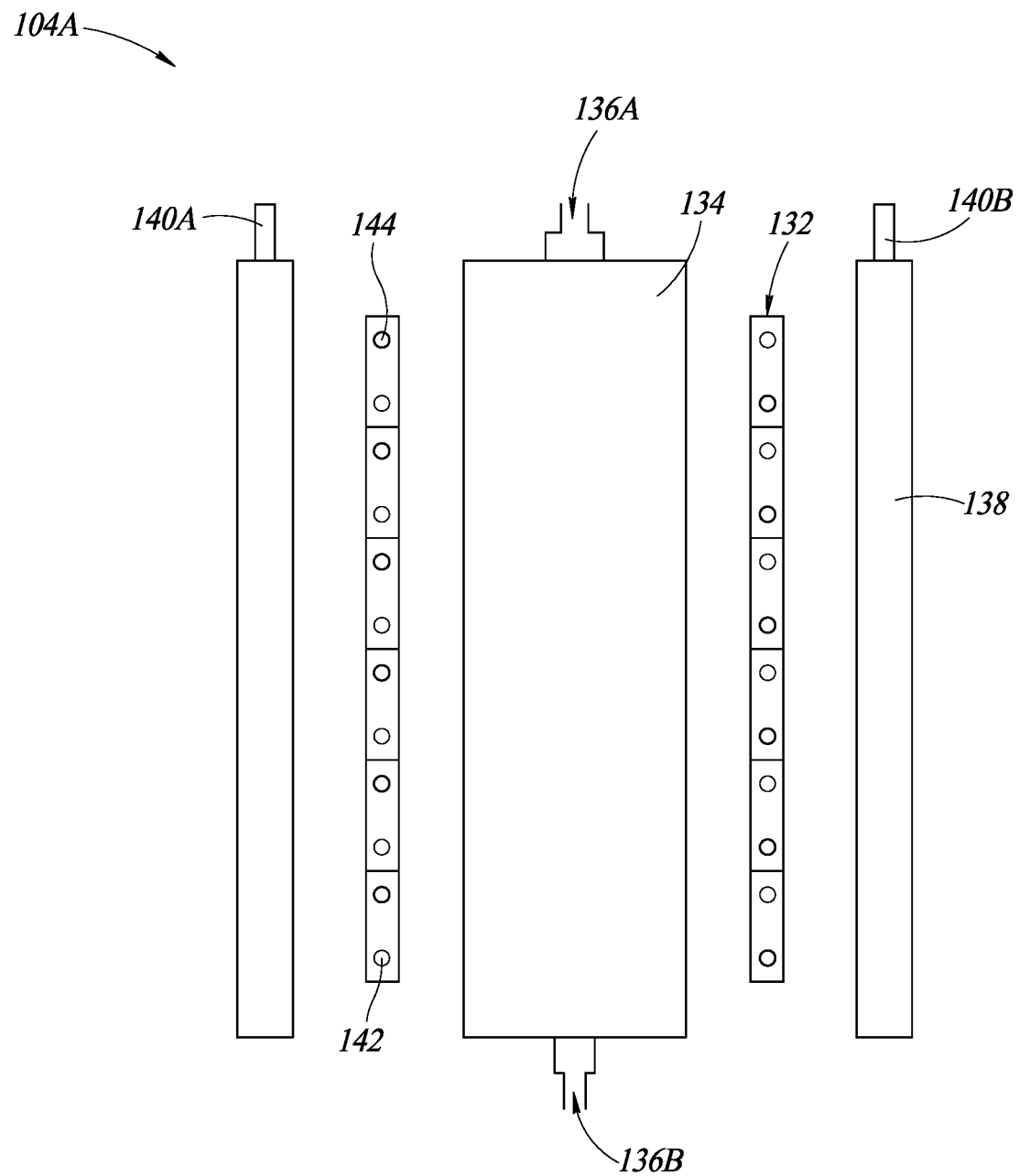

FIGS. 4-6 are various views of the generator 104A of the system 100 shown in FIG. 1, which is a thermoelectric generator ("TEG") 104A some embodiments of the system. In some implementations, the thermoelectric generator 104A includes several identical TEG modules 132, which may be optionally positioned in a number of different layouts. For example, FIGS. 4-6 illustrate multiple individual TEG modules 132 in a vertical stack array with FIG. 5 illustrating a plan cross-sectional view through one module 132. With reference to FIGS. 4-6, the generator 104A includes a heat transfer block 134 with the thermal transfer medium from the coil 126 (FIG. 3) flowing through the heat transfer block 134. The transfer medium enters the block 134 through inlet 136A and exits through outlet 136B with block 134 conducting thermal energy to a hot side of each TEG module 132 in the generator 104A. Coolant, such as from cooling system 106 (FIG. 1), circulates through cold transfer blocks 138 via cold block inlets 140A and cold block outlets 140B. The coolant removes excess heat from a cold side of each TEG module 132. The difference in temperature across the TEG modules 132 results in a positive electrical potential energy between negative electrical leads 142 and positive electrical leads 144 of the TEG modules 132, as illustrated in FIG. 6. In FIG. 6, each TEG module 132 has one side in contact with the heat transfer block 134 (i.e., the hot side) and one side in contact a cold transfer block 138 (i.e., the cold side) to create electrical potential across the modules 132. The electric potential can be harnessed for external energy demand through leads 142, 144.

In some embodiments, the cold transfer blocks 138 are positioned on all sides of the heat transfer block 134. Thus, the TEG generator 104A in FIGS. 4-6 is designed in a way that maximizes hot and cold surface area for greater thermal conductivity and thermal isolation, which results in a higher efficiency relative to known TEG generators. For example, while a conventional TEG generator may achieve 20-30% efficiency in converting incoming thermal energy to output electrical energy, the TEG generator 104A may achieve at least 50%, at least 60%, at least 70%, at least 80% or higher efficiency due to the increased surface area between the hot and cold sides of the TEG modules 132. Further, the generator 104A has a modular design that enables removal and replacement of TEG modules 132 for maintenance, or to upgrade the modules 132 as TEG technology advances. A size and shape of each cold transfer block 138 and the heat transfer block 134 can be selected based on the desired use case, as well as the number of TEG modules 132 used, and other design factors.

Figure 7:
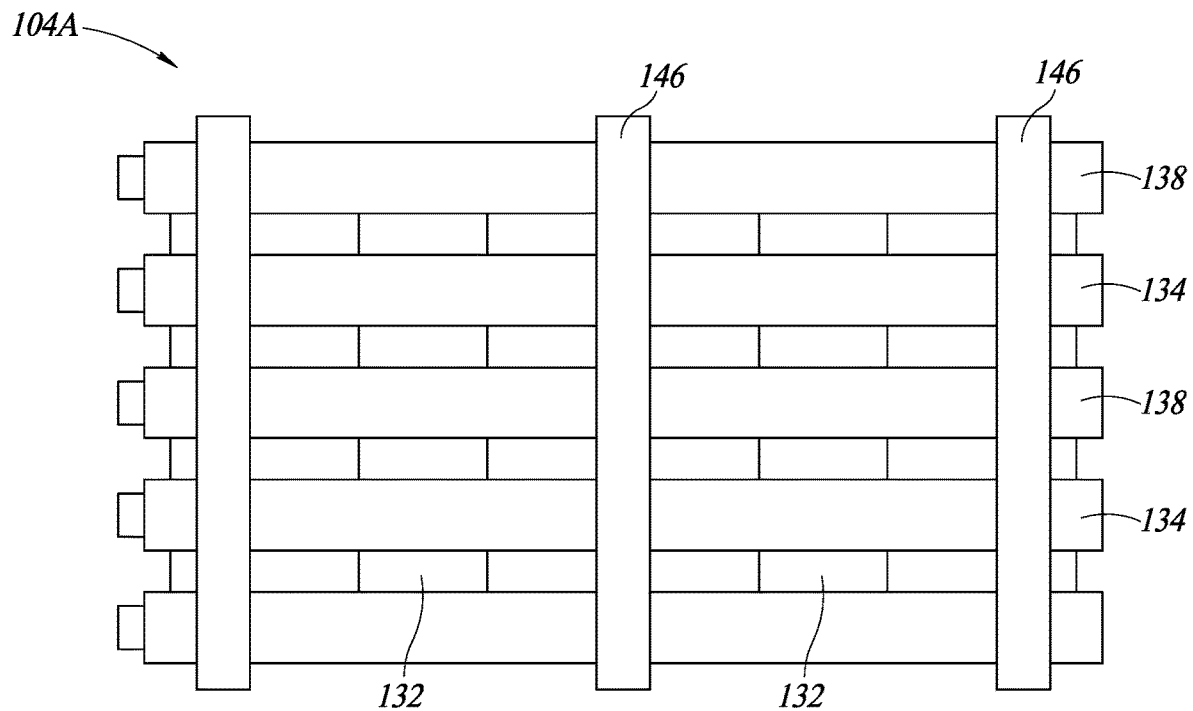
FIG. 7 is a schematic illustration of a thermoelectric generator stack of the system of FIG. 1.

FIG. 7 is a schematic illustration of an alternative embodiment of the thermoelectric generator 104A to demonstrate that additional configurations of the generator 104A are contemplated herein. In FIG. 7, layers of cold transfer blocks 138 and heat transfer blocks 134 are alternated and stacked with TEG modules 132 between the layers. The TEG modules 132 are arranged such that the cold and hot sides of the modules 132 interface with the corresponding layers of cold transfer blocks 138 and heat transfer blocks 134, respectively. The components of the generator 104A may be coupled together at multiple points, such as with clamps 146 that maintain the desired pressure on each TEG module 132 for optimal surface contact with the layers of transfer blocks 134, 148.

Figure 8:
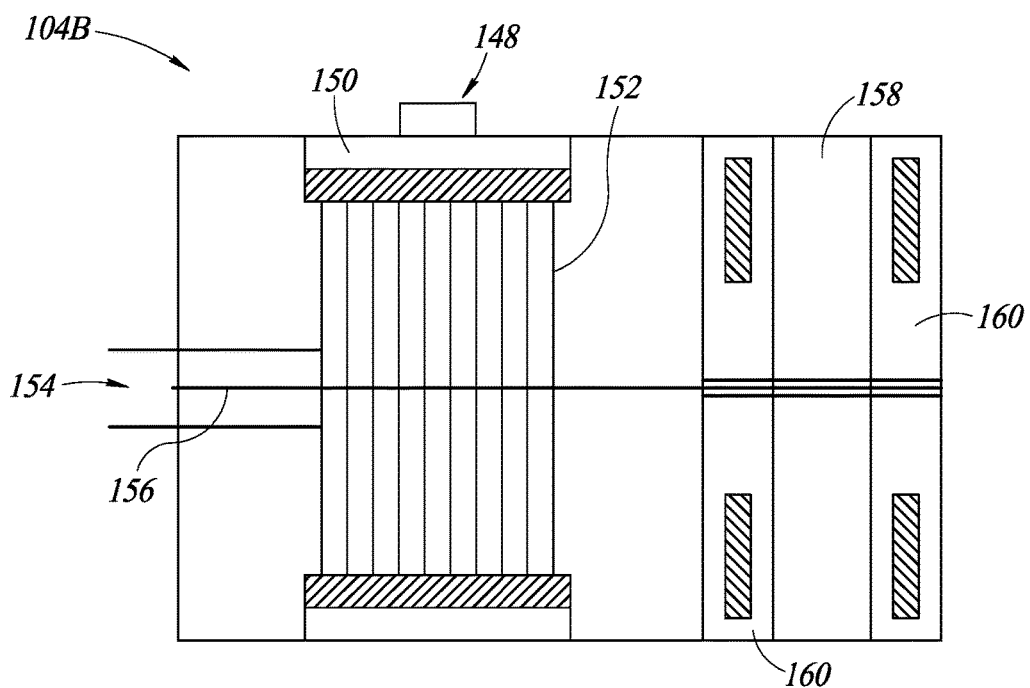
FIGS. 8-10 are various views of a turbine of the system of FIG. 1.
Figure 9:
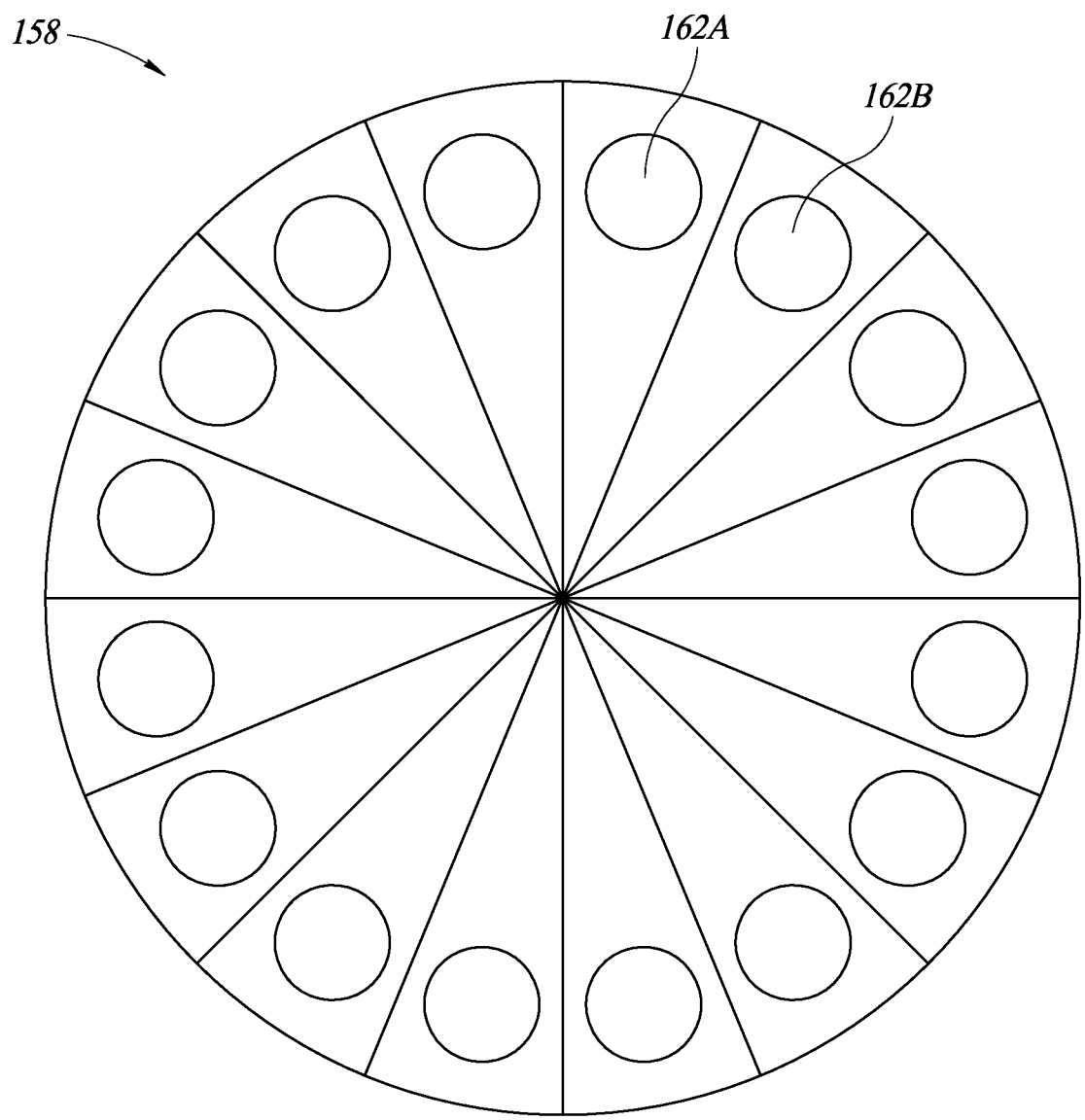
Figure 10:
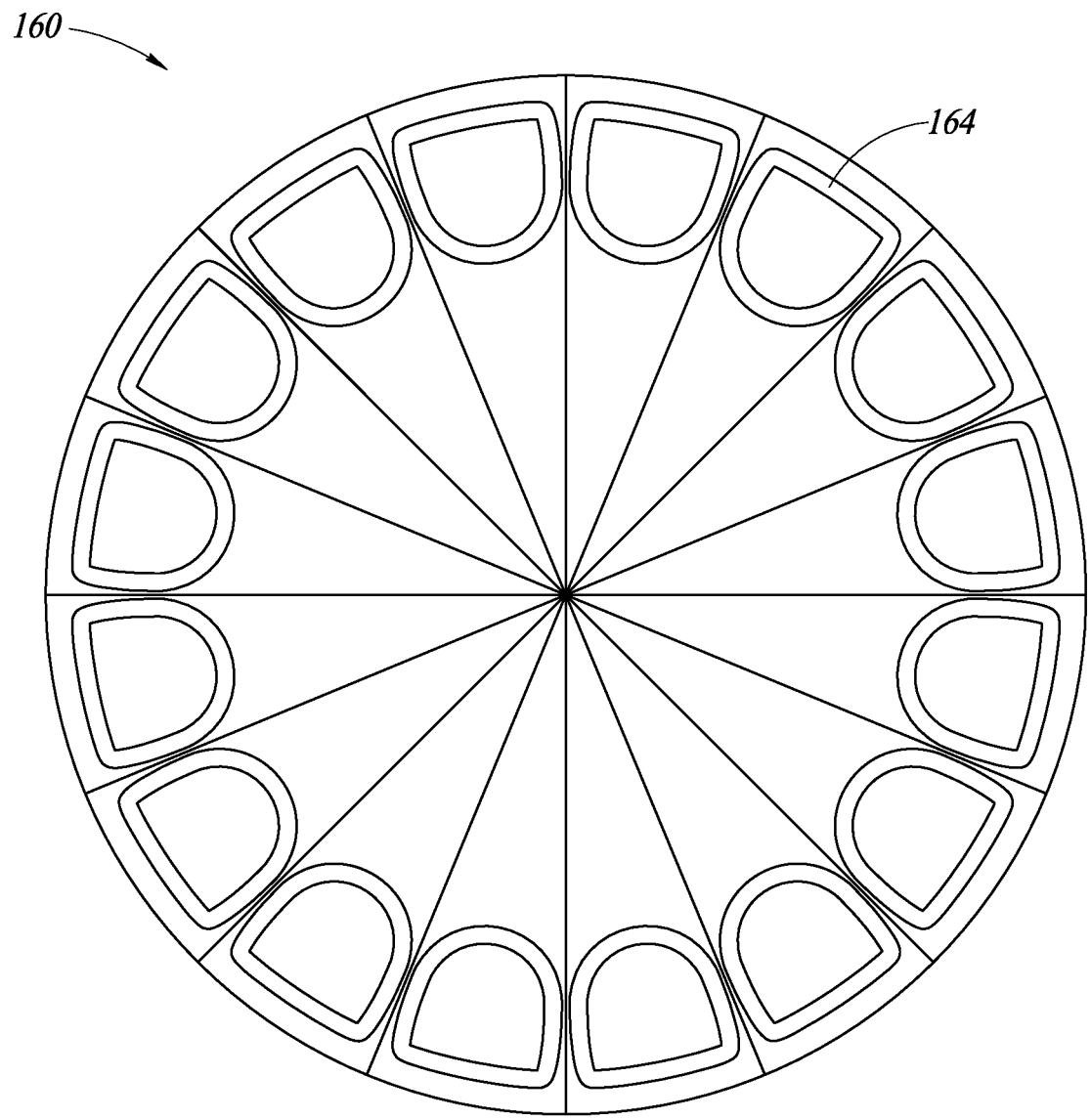

Alternatively, or in addition to the generator 104A, in some embodiments the system 100 includes the generator 104B illustrated in more detail in FIGS. 8-10. Specifically, in some embodiments the generator 104B is a turbine generator 104B to capture kinetic energy from the thermal transfer medium passing through the system 100. In one non-limiting example, the turbine generator 104A is a bladeless boundary-layer turbine that includes both a turbine and a generator in one housing assembly. With reference to FIGS. 8-10, the thermal transfer medium, which is steam in some embodiments, enters the turbine through inlet 148 and is distributed through a distribution ring 150 in communication with the inlet 148. The distribution ring 150 distributes the thermal transfer medium to turbine disks 152 at a shallow angle to cause the disks 152 to spin as the steam travels through the disks 152 to central outlet 154. The disks 152 are coupled to, and mounted on, a shaft 156 such that rotation of the disks 152 results in rotation of the shaft 156. The rotation of the shaft 156 also causes one or more rotor disks 158 to spin between one or more corresponding stator disks 160 to produce electricity from the thermal transfer medium.

Various embodiments of rotor and stator disks 158, 160 are described in more detail with reference to FIG. 9 and FIG. 10. Specifically, FIG. 9 illustrates an example rotor disk 158 and FIG. 10 illustrates an example stator disk 160. Beginning with FIG. 9, the rotor disk 158 includes sets of magnets 162A, 162B with alternating polarity positioned around an outer edge of the disk 158. Turning to FIG. 10, the stator disk 160 includes copper coils 164 in a selected configuration. The rotation of the rotor disk 158 and the stator disk 160 relative to each other creates a rotating magnetic field that induces a voltage and produces current, or creates electricity that can be harnessed for use.

Figure 11:
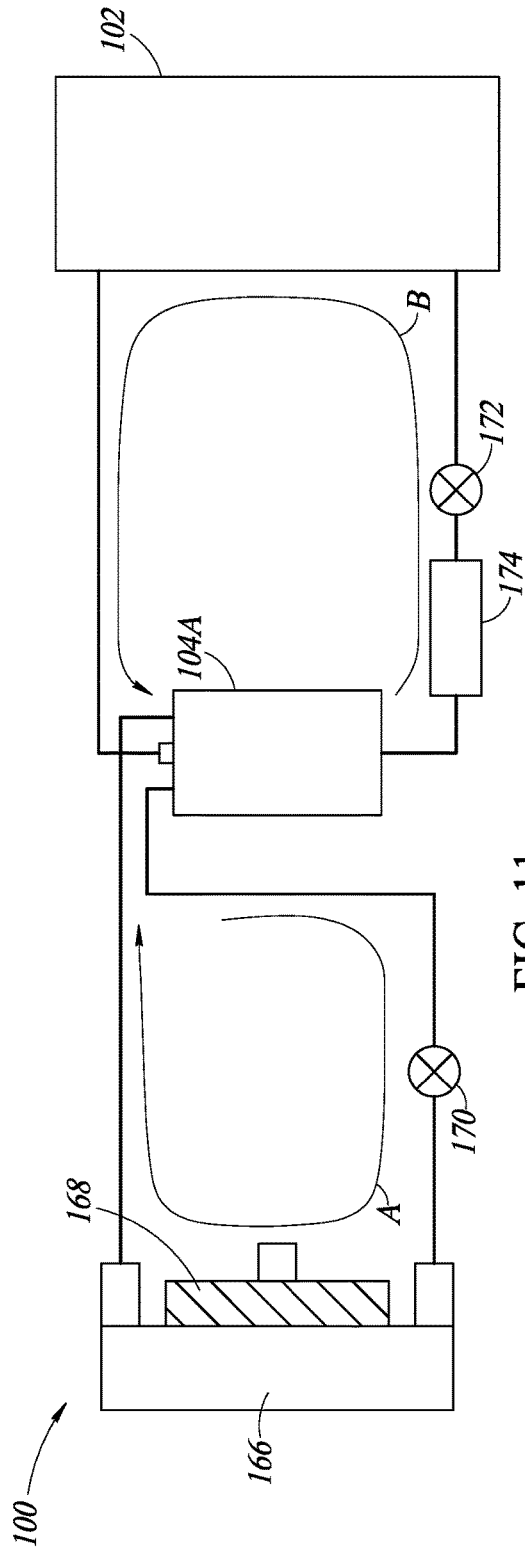
FIGS. 11-13 are schematic views of embodiments of auxiliary support systems of the system of FIG. 1.
Figure 12:
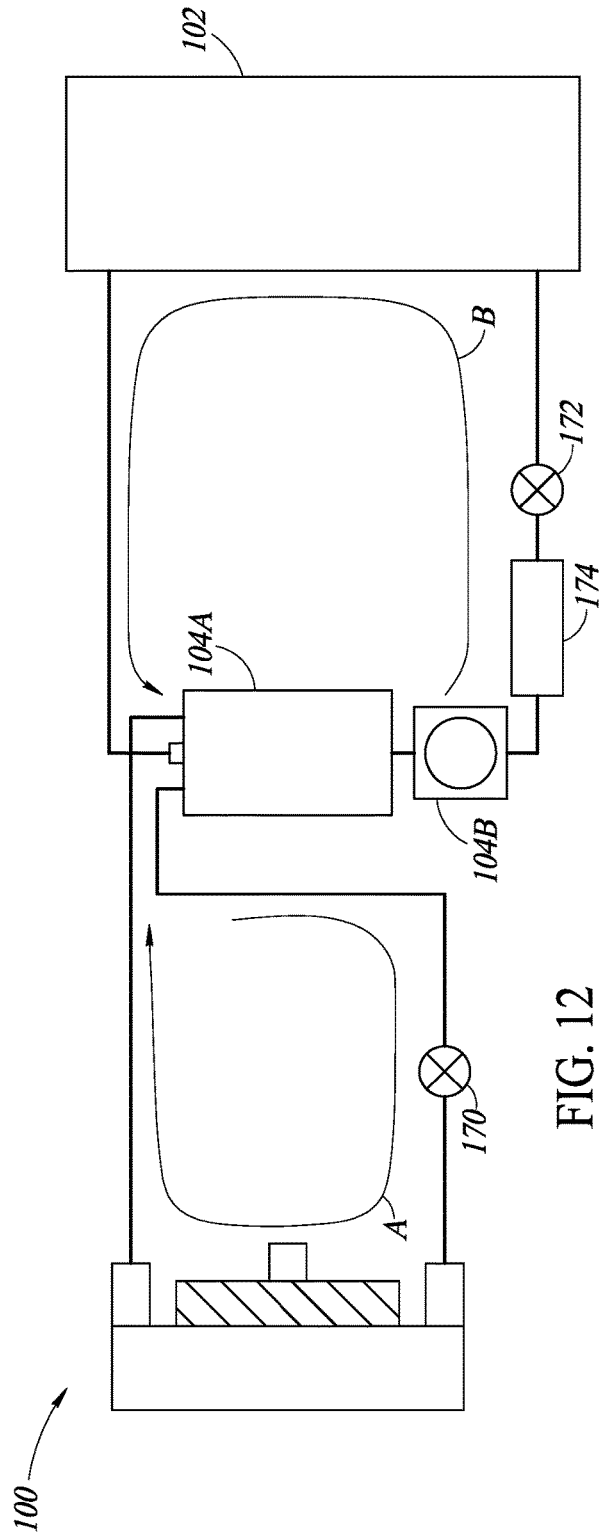
Figure 13:
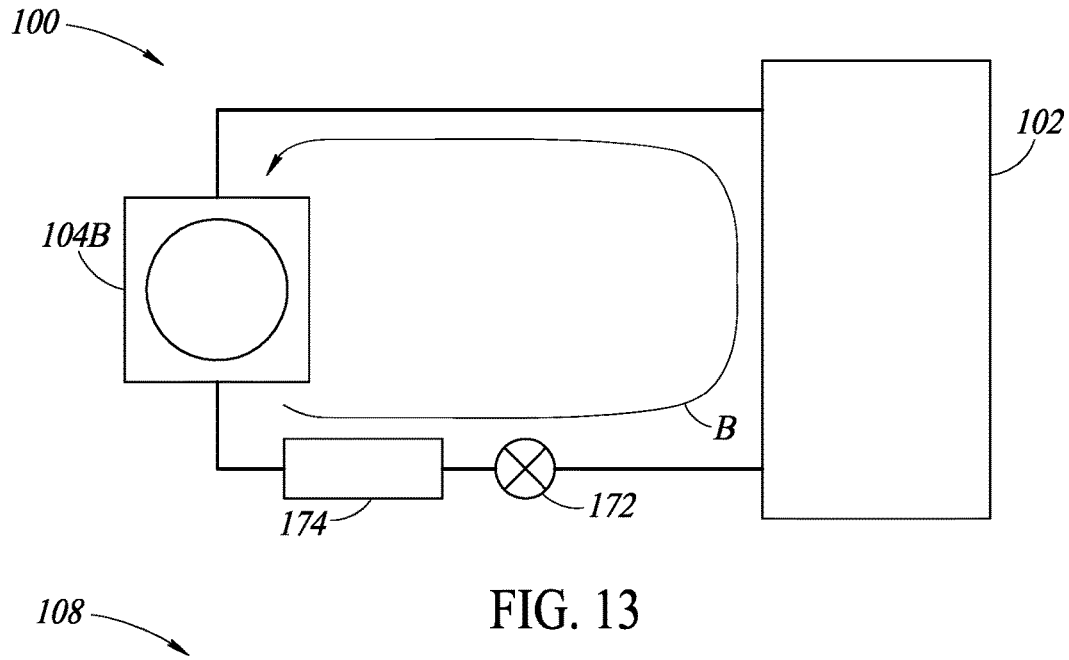

FIGS. 11-13 are schematic views of embodiments of auxiliary support systems of the system of FIG. 1. In particular, FIGS. 11-13 illustrate additional features of the system 100 that may be adapted according to the different types of generators 104A, 104B employed by the system 100. Beginning with FIG. 11, the system 100 may include only the generator 104A, which may also be referred to herein as the TEG array 104A. In such embodiments, the system 100 further includes a heat exchanger 166, a fan 168, and a pump 170 in fluid communication with the TEG array 104A. The heat exchanger 166, fan 168, and pump 170 remove excess heat in the TEG array 104A from the system 100 to enable a selected temperature differential across the TEG modules 132, as described herein. The heat exchanger 166, fan, 168, and pump 170, in combination with the TEG array 104A are in a cold loop as generally indicated by arrow A.

In some embodiments, the system 100 further includes a circulation pump 172 and a condensing reservoir 174 in communication with the thermal storage device 102. The circulation pump 172 moves the thermal transfer medium from reservoir 174 to the thermal storage device 102. As discussed herein, the thermal transfer medium enters the thermal storage device 102 via coil 126, absorbs thermal energy as it travels upward through the thermal storage device 102 and exits the thermal storage device 102 to generator 104A for conversion to electricity. At the generator 104A, the thermal transfer medium releases thermal or kinetic energy, or both, for conversion to electrical energy. Once the thermal or kinetic energy, or both, is exhausted from the thermal transfer medium, the thermal transfer medium returns to condensing reservoir 174. Thus, the thermal storage device 102, the generator 104A, the reservoir 174, and the circulation pump 172 create a hot loop as generally indicated by arrow B, with the cold loop and the hot loop interfacing at the generator 104A.

FIG. 12 is a schematic illustration of the auxiliary components of an embodiment of the system 100 where the system 100 includes both the TEG array 104A and a turbine generator 104B. This embodiment of the system 100 with both generators 104A, 104B may include the same cold loop described above in FIG. 11 as indicated by arrow A. However, the system 100 additionally includes the turbine generator 104B in the hot loop indicated by arrow B. Specifically, the turbine generator 104B is in series with the TEG array 104A in some embodiments with the turbine generator 104B directly downstream from the TEG array 104A and directly upstream of the reservoir 174. Thus, the thermal transfer medium pass through the thermal storage device, releases kinetic or thermal energy, or both, at the TEG array 104A first, and any remaining energy at the turbine generator 104B before returning to condenser 174 and back to the thermal storage device 102 via pump 172. Alternatively, the TEG array 104A and the turbine generator 104B may be arranged in parallel in the system 100 such that some portion of the thermal transfer media passes through generator 104A, and some portion of the thermal transfer media passes through generator 104B, before returning to reservoir 174.

FIG. 13 is a schematic illustration of the auxiliary components of one embodiment of the system 100 where the system 100 includes only a turbine generator 104B. In such embodiments, the system 100 includes only the hot loop generally indicated by arrow B and does not include the cold loop indicated by arrow A in FIG. 11 and FIG. 12. In other words, the cold loop is not necessary in all embodiments because there is no need to regulate the temperature differential in the turbine generator 104B. Thus, if the system 100 includes only the turbine generator 104B as in FIG. 13, the cold loop may be omitted. Thus, the system 100 includes only the thermal energy storage device, the turbine generator 104B, the reservoir 174, and the pump 172 in some embodiments.

It is to be appreciated that the embodiments of the disclosure contemplate different types and configurations of closed cold and hot loops that can be selected based on factors such as the intended use case, geographical location, climate, temperature, and other environmental factors. Thus, the present disclosure is not limited solely to the components described above and illustrated in FIGS. 11-13.

Figure 14:
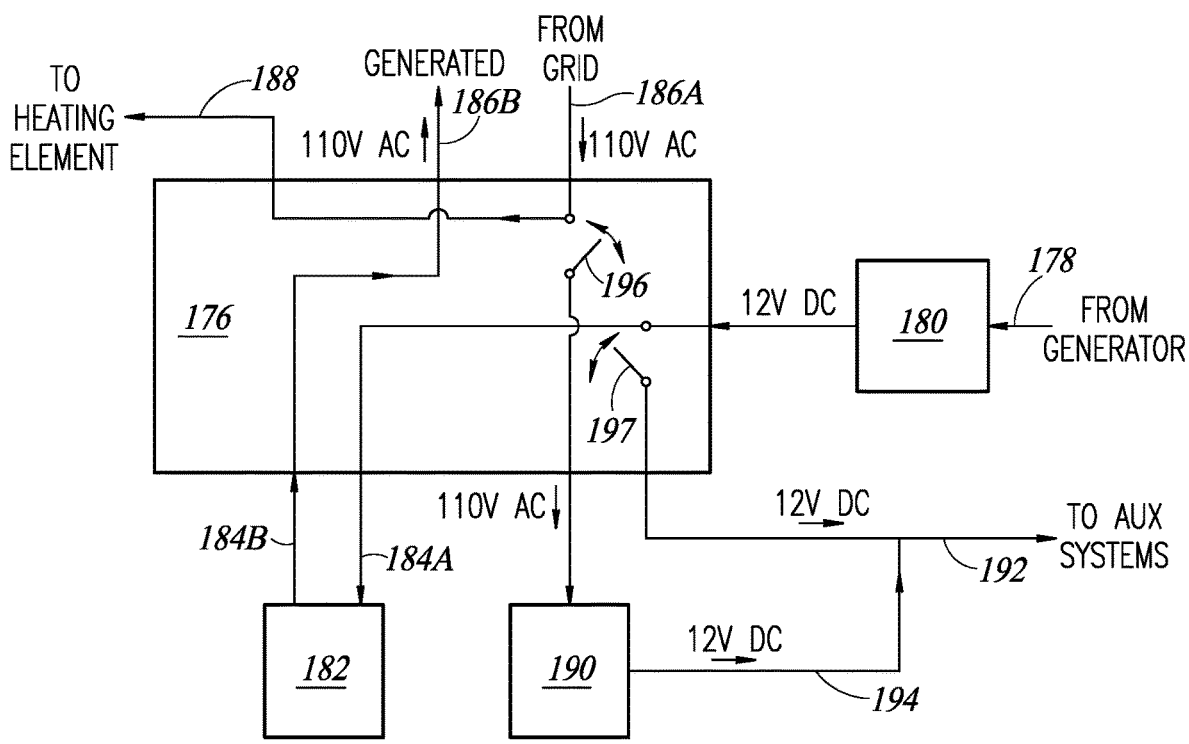
FIG. 14 is a schematic illustration of an embodiment of a controller of the system of FIG. 1.

FIG. 14 is a schematic illustration of an embodiment of the controller 108 of the system 100. The controller 108 may perform various functions described herein, including electrical distribution and regulation as well as sensor monitoring and safety. Some embodiments of the controller 108 include a main panel 176 with internal hardware for routing of electrical power from a power source to the various electrical components discussed herein. The thermal energy storage device 102 (FIG. 2) as well as other components of the system, such as generators 104A, 104B, may include various sensors, such as a temperature sensor, a voltage sensor, and a current sensor in some non-limiting examples. The main panel 176 is in communication with the sensors of the system 100 and may include hardware for monitoring, communicating alerts, and adjusting operating parameters of the system 100 based on the detected parameters (i.e. temperature, voltage, current, and others) from the sensors of the system 100.

The electricity generated by the generators 104A, 104B (FIG. 1) is provided to the controller 108 via a generator output 178 where the electricity is conditioned and regulated as needed by power regulator 180 before entering main panel 176. As shown in FIG. 14, the power output from the regulator 180 may be 12V DC power in some embodiments. The controller 108 further includes an inverter 182 in communication with the main panel 176 through inverter input 184A and inverter output 184B. The inverter 182 receives the output of the regulator 180 via inlet 184A, which may be 12V DC power, converts it to alternating current electricity, and sends it back to the main panel 176 through outlet 184B for distribution as usable external electricity. In some embodiments, the inverter 182 also includes a transformer for converting the incoming power from the regulator 180 from a lower voltage to a higher voltage (i.e., from 12V to 110V as shown in FIG. 14) before distribution to the outlet 184B. The controller 108 further includes a utility power input 186A in communication with the main panel 176. Power or electricity from an external source, such as the power grid or a renewable energy source, enters the controller 108 through input 186A and the main panel 176 distributes the utility power to charge and maintain the thermal energy storage device 102 (FIG. 2) as well as for other functions of the electrical components of the system 100 described herein.

The main panel 176 may further include a thermostat or temperature sensor that monitors and regulates the internal temperature of the thermal energy storage device 102 (FIG. 2) via sensors onboard the device 102 or through a direct connection to the device 102. Specifically, the controller 108 may include a heater power input 188 in communication with the thermal energy storage device 102 (FIG. 2) for selectively activating the heating element 118 in the thermal energy storage device 102 (FIG. 2) based on the detected temperature and other factors.

In some embodiments, the controller 108 includes an additional inverter 190, which may also be referred to as an external power inverter 190 that regulates and converts incoming higher voltage electricity (e.g., 110V or 220V AC) from power input 186A (from grid power, renewable power, battery power, or combinations thereof) to a lower voltage (e.g., 12V DC) for use by the system 100, as described in more detail below. Alternatively, the components of the system 100 may be powered using the electricity output from the power regulator 180 through internal power output 192. In other words, internal power output 192 forms an internal loop with the system 100 where electricity generated by the generators 104A, 104B is provided to regulator 180 via generator output 178 and output for use by components of the system 100 (such as to charge storage device 102, power the sensors, and other functions described herein) via internal output 192. Thus, the system 100 may be self-sufficient with external electricity from input 186A only used to replace losses from operation of the system 100 in some operational configurations. For example, external power from input 186A may be provided to external inverter 190, which regulates and converts the incoming higher voltage (110V AC) to a lower voltage (12V DC) and outputs the lower voltage electricity for use by the system 100 via external inverter output 194.

The controller 108 may also include a switch 196 between an external power input line from the external power input 186A to the external inverter 190, as shown in FIG. 14. The switch 196 may be manipulated according to a manual input or may be controlled automatically by the main panel 176 based on detected parameters of the system 100. The switch 196 enables AC input power to the external inverter 190 from external input 186A in some example use configurations. As shown in FIG. 14, the controller 108 may also include a switch 197 between an output of the regulator 180 and the internal power output 192. The switch 197 may be manipulated according to manual inputs or may be controlled automatically by the main panel 176 based on detected parameters of the system 100 and the position of the switch 196. The switch 197 enables selective use of DC power output from the regulator 180 to power auxiliary systems, as described herein.

In some embodiments, switches 196, 197 are to be simultaneously toggled opposite each other for switching auxiliary system power between the output of regulator 180 and the output of external inverter 190. In other words, if switch 196 is open, switch 197 is simultaneously closed, or vice versa. For example, switch 196 can be toggled open and switch 197 can be toggled closed. This arrangement of the switches 196, 197 causes the shutdown of external regulator 190 and creates the internal power loop mentioned in the previous paragraph where power output from the regulator 180 is used to power auxiliary systems. This arrangement may be preferable to using external power where enough power is being generated and conditioned through regulator 180 at a selected instance to power auxiliary systems because it eliminates the use of external power and associated environmental impacts.

If the power generated by the generators and then conditioned by regulator 180 is insufficient to power the auxiliary systems, the switch 196 can be toggled closed and switch 197 can be toggled open. In this arrangement of the switches 196, 197, the external inverter 190 is powered "ON," and produces lower voltage output through line 194 for use by auxiliary systems through output 192. Simultaneously, the switch 197 being in the open position disconnects power from the output of regulator 180 from flowing to the auxiliary power output 192. In other words, this arrangement disconnects the auxiliary systems from the internal generated power via regulator 180 and instead powers the auxiliary systems through external power from the grid or other power source via external inverter 190. Further, the arrows in FIG. 14 demonstrate that external power from external power input 186A may be used to charge the thermal storage device 102 via heater power input 188. In some embodiments, the controller 176 may also enable both switches 196, 197 to be closed, such that the system 100 uses both internal power from regulator 180 and external power from the grid or other source to power auxiliary systems. In this arrangement, the amount of external power needed to operate the system 100 is reduced by the power generated by the system 100, which increases efficiency relative to conventional thermal energy storage systems.

Figure 15:
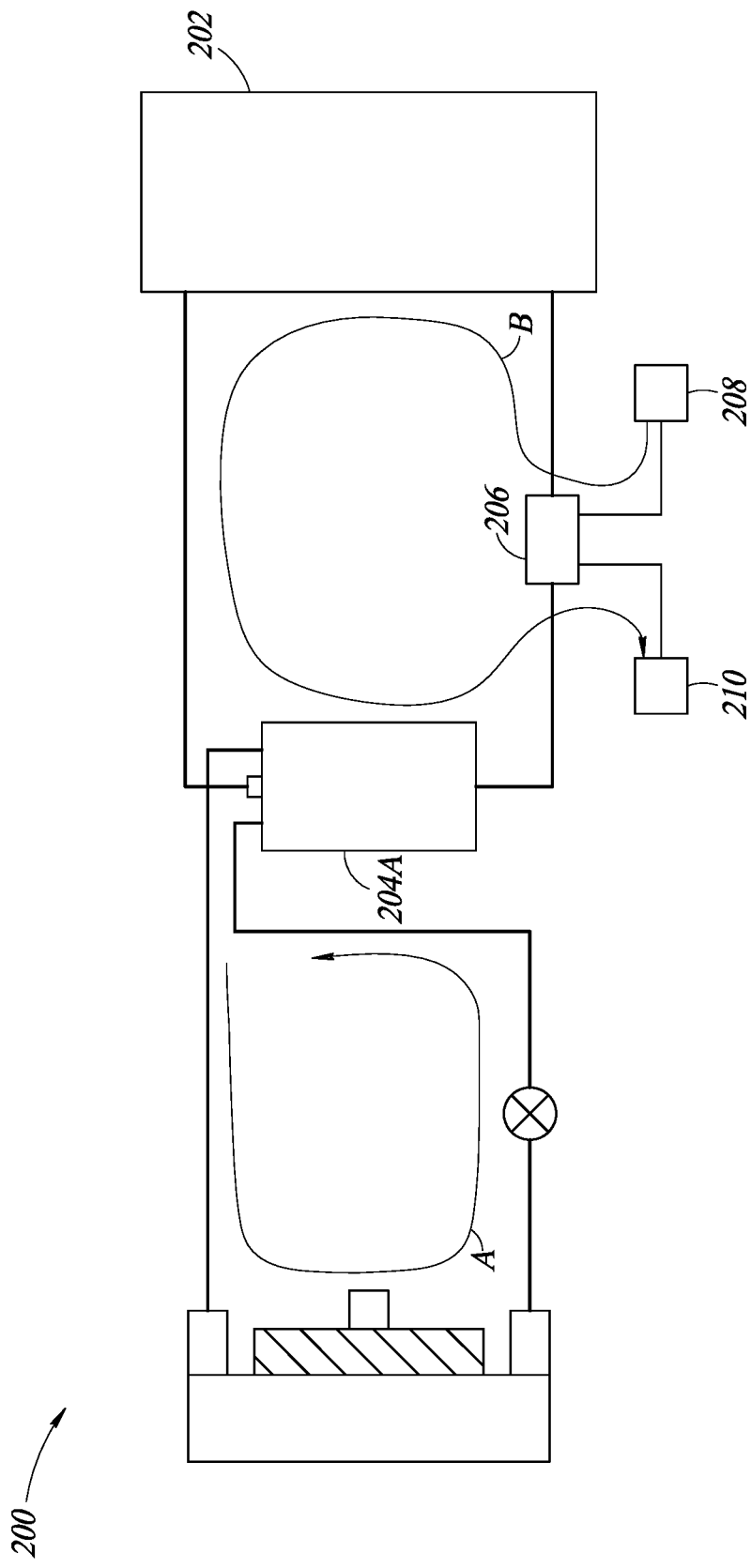
FIG. 15 and FIG. 16 are schematic illustrations of an embodiment of a thermal energy storage and power generation system with an open hot loop.
Figure 16:
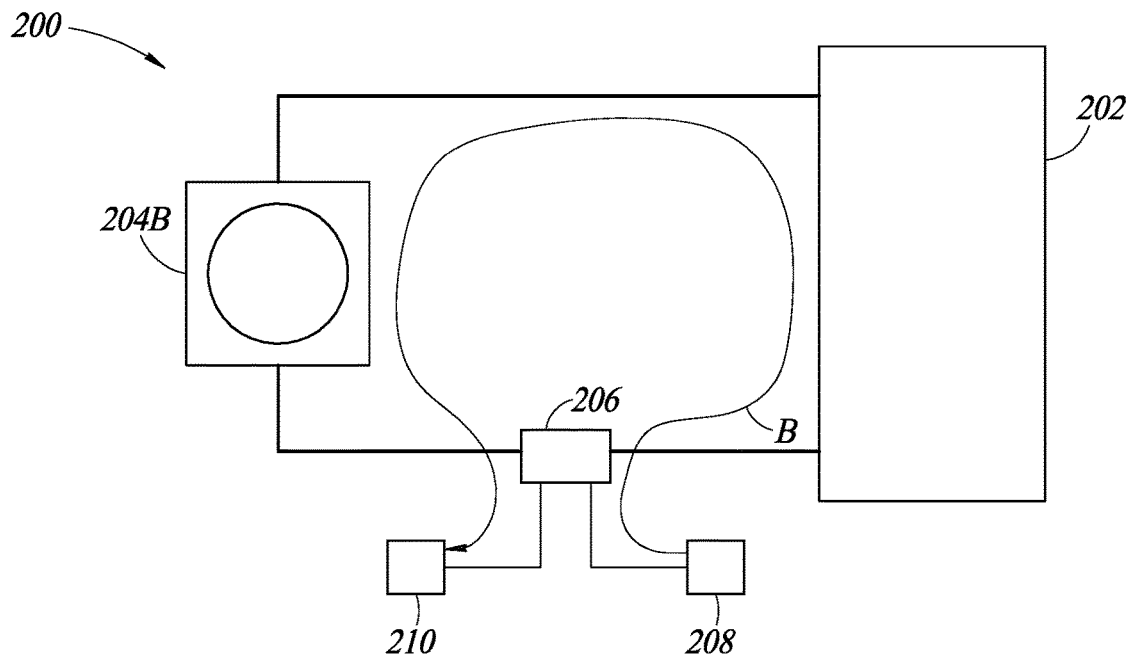

FIG. 15 and FIG. 16 are schematic illustrations of an embodiment of a thermal energy storage and power generation system 200 with an open hot loop for producing distilled water for human consumption. The system 200 may be identical to system 100 in FIGS. 11-13 except as otherwise described below.

Beginning with FIG. 15, the system 200 includes a hot loop designated by reference B between a thermal energy storage device 202 and a thermoelectric generator 204A. Unlike the system 100 in FIG. 11, the system 200 includes an open hot loop. Specifically, circulation pump 172 and condensing reservoir 174 in system 100 are replaced with a thermal exchange assembly 206, a settling tank 208, and a purified water tank 210 in system 200. The system 200 consumes unpurified water from the settling tank 208, purifies it through distillation, and generates output electrical power and purified water to purified water tank 210, as described further below with reference to FIG. 17. Thus, the system 200 is "open" in the sense that water may be input and output rather than continuously fed through the system as with system 100. FIG. 16 illustrates the system 200 with a turbine generator 204B instead of a thermoelectric generator 204A as in FIG. 15. The system 200 may also include both generators 204A, 204B in some embodiments.

Figure 17:
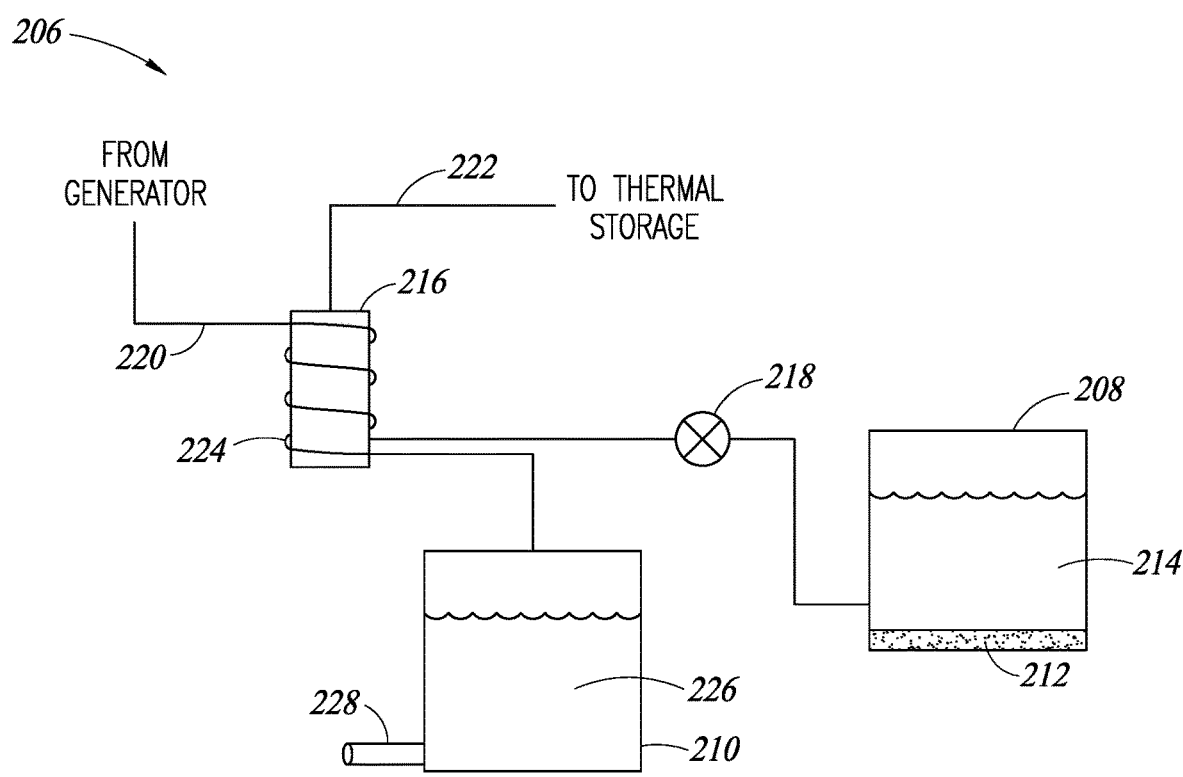
FIG. 17 is a schematic illustration of a thermal exchange assembly of the system of FIG. 15 and FIG. 16.

FIG. 17 is a schematic illustration of the thermal exchange assembly 206 of the system 200. Unpurified water 214 is stored in settling tank 208 with sediment 212 naturally separating from water 214 in the tank 208 and collecting at the bottom of the tank 208 due to gravity. Unpurified water 214 is pumped from the settling tank 208 to a thermal transfer container 216 via pump 218. The thermal transfer container 216 is in communication with an output from the generator along line 220 and thermal storage device 202 along line 222. More specifically, line 220 from the generator output may be in communication with a condenser coil 224 wrapped around the thermal transfer container 216. At the thermal transfer container 216, the unpurified water 214 absorbs remaining thermal energy from the generator output while also condensing the purified steam and water traveling through the condenser coil 224. The unpurified water 214 may then be conveyed to the thermal storage device 202 along 222. Because the unpurified water 214 absorbs thermal energy, as above, the input water to the thermal energy storage 202 from the thermal transfer container 216 is preheated to reduce thermal losses at the thermal energy storage device 202.

The distilled and purified water 226 collects in the purified water tank 210 until spigot 228 is opened for distribution of purified water 226. In some embodiments, the settling tank 214 and the thermal transfer container 216 may be designed in a way that allows for removal and cleaning to remove contaminants and sediment build up and may include various valves, removable lids and covers, screens, and other such components. Further, the system 200 may include various features for the purification of water, including but not limited to filters, screens, and other like devices. In some embodiments, the purified water 226 is the result of condensing steam with the unpurified water remaining after separation of the steam returned to the settling tank 208.

In view of the above, the concepts of the disclosure are generally directed to thermal energy storage and power generation devices, systems, and methods, that overcome the deficiencies of known systems and substantially improve conversion efficiency from thermal or kinetic potential to electricity. Thus, the concepts of the disclosure provide a viable alternative to volatile, toxic, and expensive batteries that are modular and adaptable to residential and commercial scales to enable widespread use.

Certain words and phrases used in the specification are set forth as follows. As used throughout this document, including the claims, the singular form "a", "an", and "the" include plural references unless indicated otherwise. Any of the features and elements described herein may be singular, e.g., a sensor may refer to one sensor and a memory may refer to one memory. The terms "include" and "comprise," as well as derivatives thereof, mean inclusion without limitation. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Other definitions of certain words and phrases are provided throughout this disclosure.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the present disclosure.

Generally, unless otherwise indicated, the materials for making the invention and/or its components may be selected from appropriate materials such as metal, metallic alloys (high strength alloys, high hardness alloys), composite materials, ceramics, intermetallic compounds, plastic, 3D printable materials, thermosetting compounds, polymers, resins, concrete, and the like.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described embodiments, but should be defined only in accordance with the following claims and their equivalents.

The invention claimed is:

1. A system, comprising:
 a thermal energy storage device, including:
  a container;
  a heating element in the container;
  a pair of fins in the container and arranged on opposite sides of the heating element;
  a thermal storage material in the container and surrounding the heating element and the pair of fins;
  a tube in the container and extending around a perimeter of the thermal storage material, the tube having an inlet and an outlet extending through the container;
 a generator in communication with the outlet and the inlet of the tube of the thermal energy storage device;
 a cooling system in communication with the generator; and
 an electrical generation and distribution system in communication with the thermal energy storage device, the generator, and the cooling system.

2. The system of claim 1, wherein the container of the thermal energy storage device is an inner container, the thermal energy storage device further including:
 an outer container; and
 an insulation layer between the inner container and the outer container.

3. The system of claim 2, wherein the insulation layer is at least one of aerated concrete, fiberglass, and a vacuum layer.

4. The system of claim 2, wherein the outer container and the inner container are metal.

5. The system of claim 1, wherein the heating element of the thermal energy storage device includes a plurality of contacts electrically connected to the heating element and extending through the container, the system further comprising:
 a power source in communication with the plurality of contacts.

6. The system of claim 5, wherein the power source is one or more of an electrical grid and a renewable energy source.

7. The system of claim 1, wherein the tube is copper that is coiled around the perimeter of the thermal storage material from a bottom to a top of the container.

8. The system of claim 1, wherein the thermal storage material includes an iron oxide mineral.

9. The system of claim 1, wherein the generator includes one or more of a turbine, a bladeless turbine, and a thermoelectric generator array.

10. A system, comprising:
 a thermal energy storage device, including:
  an outer container;
  an inner container; and
  an insulation layer between the outer container and the inner container, the inner container including:
   a heating element having electrical contacts extending through the inner container and the outer container;
   at least one fin interfacing with the heating element;

a thermal storage material surrounding the heating element and the at least one fin; and a tube coiled around a perimeter of the thermal storage material from a bottom to a top of the inner container, the tube having an inlet and an outlet extending through the inner container and the outer container.

11. The system of claim 10, further comprising:

a generator in communication with the outlet and the inlet of the tube of the thermal energy storage device;

a cooling system in communication with the generator; and an electrical generation and distribution system in communication with the thermal energy storage device, the generator, and the cooling system.

12. The system of claim 10, wherein the thermal energy storage device and the generator are in communication in a hot loop.

13. The system of claim 12 wherein the hot loop is a closed hot loop including a condensing reservoir and a recirculation pump for returning thermal transfer media from the generator to the thermal energy storage device.

14. The system of claim 12 wherein the hot loop is an open hot loop including a thermal exchange assembly, a settling tank, and a purified water tank.

15. The system of claim 10, wherein the tube of the thermal energy storage device is copper.

16. The system of claim 10, wherein the outer container and the inner container are the same material.

17. The system of claim 10, wherein the insulation layer is at least one of aerated concrete, fiberglass, and a vacuum layer.

18. The system of claim 10, further comprising:

a thermally insulating lid on the outer container and the inner container.

19. The system of claim 18, wherein the thermally insulating lid includes aerated concrete.

20. A system, comprising:

a thermal energy storage device, including:
　a container;
　a heating element in the container;
　a pair of fins in the container and arranged on opposite sides of the heating element;
　a thermal storage material in the container and surrounding the heating element and the pair of fins;
　a tube in the container and extending around a perimeter of the thermal storage material, the tube having an inlet and an outlet extending through the container;

a generator in communication with the outlet and the inlet of the tube of the thermal energy storage device in a hot loop; and an electrical generation and distribution system in communication with the thermal energy storage device and the generator.

21. The system of claim 20 wherein the hot loop is a closed hot loop including a condensing reservoir and a recirculation pump for returning thermal transfer media from the generator to the thermal energy storage device.

22. The system of claim 20 wherein the hot loop is an open hot loop including a thermal exchange assembly, a settling tank, and a purified water tank.

* * * * *